United States Patent [19]
Schuler

[11] Patent Number: 4,804,482
[45] Date of Patent: Feb. 14, 1989

[54] COMPOSITION FOR EXTINGUISHING FIRES AND FIRE RETARDANT COATING

[76] Inventor: Harald W. Schuler, Box 79, 58500 Mullsjo, Sweden

[21] Appl. No.: 117,494

[22] Filed: Nov. 6, 1987

[51] Int. Cl.[4] ........................ A62D 1/00; C09K 21/00; C09D 5/16; C09D 5/18

[52] U.S. Cl. ........................ 252/7; 106/18.11; 106/18.26; 169/45; 169/46; 169/47; 252/2; 252/602; 252/607; 252/608

[58] Field of Search ........................ 252/2, 602, 6, 607, 252/7, 608, 74; 106/15.05, 18.11, 18.26; 169/45, 46, 47

[56] References Cited

U.S. PATENT DOCUMENTS

| | | | |
|---|---|---|---|
| 1,278,716 | 9/1918 | Mork | 252/7 |
| 1,863,321 | 6/1932 | Austin | 252/7 |
| 1,895,530 | 1/1933 | Thomas et al. | 252/7 |
| 1,895,692 | 1/1933 | Thomas et al. | 252/7 |
| 4,169,827 | 10/1979 | Gerlach et al. | 523/458 |
| 4,194,979 | 3/1980 | Gottschall | 252/7 |
| 4,359,096 | 11/1982 | Berger | 252/3 |
| 4,560,485 | 12/1985 | Szekely et al. | 252/7 |
| 4,608,198 | 8/1986 | Watanabe et al. | 524/410 |
| 4,695,594 | 9/1987 | Pressman | 521/81 |

*Primary Examiner*—Howard J. Locker
*Attorney, Agent, or Firm*—Eric P. Schellin

[57] ABSTRACT

The present invention relates to a composition for extinguishing fire and for impregnating organic materials against combustion. The composition comprises an aqueous solution, a method of preparation of this composition and a method of extinguishing and impregnating organic material against combustion.

3 Claims, No Drawings

COMPOSITION FOR EXTINGUISHING FIRES AND FIRE RETARDANT COATING

BACKGROUND OF THE INVENTION

Water and aqueous solutions as well as solutions containing water which form a foam when sprayed or heated have long been used to extinguish fire. Likewise, solutions containing water have been used for impregnation which contain, for example, inorganic salts such as ammonium salts, phosphates or water glass.

It was surprisingly discovered that citric acid salts of a specific composition for the two purposes exhibit an extraordinary fire-extinguishing and combustion-retarding action.

SUMMARY OF THE INVENTION

The present invention concerns a composition for extinguishing fire and for impregnating organic material against combustion which composition comprises an aqueous solution, the composition comprises an aqueous solution having a pH of between 7.0–8.0 and consists of an aqueous solution of 300–350 g/l citric acid which contains an equimolar amount of sodium and potassium which is present thereto in a ratio of 0.6–1.0:100 (Na:K).

The invention is also relates to a method for preparing this composition which comprises the steps of dissolving 300–360 g citric acid and an equimolar amount of carbonate, hydrogen carbonate and/or hydroxide of sodium and potassium in a ratio of 0.6–1.0:100 (Na:K) and adding water up to 1 liter.

The composition is suitable for extinguishing fire and also for impregnating organic materials such as wood, cloth, foam material, etc. The impregnation can also be performed by dipping this composition into a bath by pressure impregnation or by spraying it on any material. When the cloth is impregnated, the weight of the cloth is most preferably raised 2–15%, e.g. 8–10% in the dry state. When wood is impregnated, the gain in weight is preferably 1–5%, e.g. 2–3% in the dry state. In an impregnation within this range (400 g impregnation liquid per $m^2$ area), a fire resistance was achieved with a chip board of 10 mm and with a pine plank which met the requirements for class II surface coatings according to SIS (Swedish Standard Commission) No. 02 48 23 (NT FIRE 004). In a 5-minute test in a standardized combustion chamber, the flue gas temperature curve did not exceed the limiting curve for class II nor the light absorption 20% (average time value at the most 30% admissible).

For extinguishing, the composition is sprayed directly toward the center of the fire or in such a manner that it is distributed over the center of the fire, e.g. in the case of liquid fed fires.

It was found that the composition preferably has a pH of between 7.0–7.4 and that its pH is preferably around 7.6. The molar ratio of sodium to potassium is preferably 0.8–0.9:100 and most preferably approximately 0.84:100.

The instant composition is prepared by approximating the intended pH with various amounts of carbonate, hydrogen carbonate and hydroxide which should be used to obtain the proper pH. A fine adjustment is performed thereafter by means of the addition of citric acid or hydroxide, preferably potassium hydroxide.

The composition as such is not dangerous, is harmless and emits no noxious substances even when heated or thermally decomposed.

DETAILED DESCRIPTION OF THE INVENTION

The preparation and use of the instant composition are explained in the following examples.

EXAMPLE 1

3.30 kg citric acid, 2.05 kg potassium hydrogen carbonate and 25 g salt of soda were added to 3 liters in 1 liter of water. The entire mixture was stirred and the volume adjusted to 10 l, whereafter the pH was adjusted with the aid of solid citric acid to 7.6. The solution obtained was used for impregnating and extinguishing fires.

EXAMPLE 2

An unplaned wooden strip (50×50×500 mm) was impregnated by brushing on 25 ml of the liquid obtained according to example 1. This strip was then painted with panel paint, exposed to raid for 20 hours and sprayed three times with water. A chip board was impregnated with 200 ml of the liquid obtained according to Example 1. It was exposed to rain for 20 hours and sprayed five times with water.

The effect of the impregnation was tested with a gas burner, whereby the gas flame was held against the material for 10 minutes at a distance of 10 cm from the material. No fire occurred in any of the materials but rather it went out when the gas flame was taken away.

EXAMPLE 3

A beam (100×100×500 mm) was impregnated with 100 ml of the liquid obtained according to example 1. It was then exposed to moisture for 40 days.

A planed board (120×13×500 mm) was impregnated with 250 ml/$m^2$ of the liquid obtained according to example 1. It was also exposed to moisture for 30 days.

After the beam and the board had been dried for 5 days, they were tested in the same manner as in example 2. No combustion occurred. The same test was also performed after 40 days with the same result.

EXAMPLE 4

Various items of furniture were tested. One cloth consisted of 75% rayon and 25% cotton, a second of 100% acrylic and a third of 100% dralon. Cloths of various colors were also tested. The impregnation amount was 300 ml/$m^2$ and the liquid prepared in accordance with example 1 was used. The cloth experienced a slight color change in only a few instances and in a few instances the cloths became somewhat stiffer.

The cloths were tested with a gas flame after 24 hours and after 48 hours. The gas flame was then held at a distance of 10 cm from the cloth until holes had been burned in the cloth. When the gas flame was removed, the cloth stopped burning.

EXAMPLE 5

The same test as in example 4 was repeated with wall paper which had been coated once with the liquid according to example 1. When tested in the manner described in example 4, the free-hanging wall paper stopped burning when the gas flame was removed.

EXAMPLE 6

An ordinary box of corrugated cardboard was immersed for 10 seconds in the liquid according to example 1. It absorbed an amount of 400 ml/$m^2$. After having dried for 36 hours, the box was tested for flame safety. When the flame was removed after 10 minutes, the fire supported by the flame went out.

EXAMPLE 7

The liquid according to example 1 was tested as extinguishing agent according to the suggestion of Swedish Standard SS1192, 6th edition. The instant extinguishing agent met the requirements of class A1.

Tests were also performed on impregnated boards which were placed in gasoline fires for 8 minutes. The boards were not ignited, so that they did not burn after having been removed. They were also not reignited.

EXAMPLE 8

(Reference Example)

A mixture of
Sodium hydroxide (90%): 45 kg
Cirtric acid: 55 kg
Water: 110 l
was prepared as reference. The pH was adjusted to 7.5.

The density of the mixture proved to be 1.3. Textiles impregnated therewith received a white coating and became fairly stiff. Thus, this mixture is not particularly suitable for impregnating textiles and paper.

After standing overnight in a container, a rather large amount of bottom sediment (approximately 25% of the total dry substance content) had settled. The mixture is thus not suitable for usage in a fire extinguisher.

EXAMPLE 9

(Reference Example)

For purposes of comparison, a mixture of
Sodium hydroxide (90%): 30 kg
Potash: 15 kg
Citric acid: 52 kg
Water: 115 l
was prepared. The pH was adjusted to 7.5.

The mixture obtained had a density of 1.35 kg/l. Textiles and paper were impregnated with this mixture and dried with a heating element for 12 hours. The impregnated specimens were ignited with a gas oil burner, whereby the edges of the burned area glowed for a brief period after removal of the flame. Thus, this mixture also proved not to be particularly suitable as an impregnation composition.

A bottom sediment also formed in this mixture during standing, even though the amount was somewhat less than in the preceding example. The mixture is not suitable for fire extinguishers.

EXAMPLE 10

(Reference Example)

In this example, a mixture of
Potassium hydroxide (90%): 18 kg
Potash: 33.4 kg
Acetic acid (60%): 60 l
was prepared. The pH was adjusted to 7.5 with citric acid.

The density of the mixture was 1.36 kg/l and was adjusted to 1.3 with water. The mixture was not suitable for impregnated textiles or paper. When this mixture and the composition according to example 1, were mixed in amounts of 40% and 60% respectively, good results were achieved for extinguishing a fire of 5 l Diesel oil and 3 kg dry wood after a burning time of 5 min.

It is thus apparent that a composition in accordance with the invention achieves a better effect and does not entail the disadvantages which mixtures of citrate in other proportions have. It was also found that an acetate mixture as such is unsuitable for impregnation and does not have the same extinguishing action as the present invention.

What is claimed is:

1. A composition for extinguishing fires and impregnating organic material against combustion, which consists essentially of:
an aqueous solution of 300–350 g/l citric acid and an equimolar amount of a sodium and potassium compound in a ratio of 0.6–1.0:100 (Na:K), said aqueous solution having a pH of 7.0–8.00.

2. A method of preparing the composition of claim 1 comprising: dissolving 300–350 g citric acid and an equimolar amount of a sodium and potassium compound in a ratio of 0.6–1.0:100 (Na:K) in an amount of water up to 1 liter, whereafter the pH is adjusted to 7.0–8.00 with citric acid or an alkali carbonate, or alkali hydrogen carbonate or alkali hydroxide.

3. A composition according to claim 1 wherein said sodium and potassium compound is selected from the group consisting of a sodium and potassium carbonate, sodium and potassium hydrogen carbonate and a sodium and potassium hydroxide.

* * * * *